United States Patent
Hawley

Patent Number: 5,984,444
Date of Patent: Nov. 16, 1999

[54] ELECTROSTATIC THREE DIMENSIONAL PRINTER

[75] Inventor: James M. Hawley, 124 Sandy Hook Rd., Sarasota, Fla. 34242

[73] Assignee: James M. Hawley, Sarasota, Fla.

[21] Appl. No.: 08/882,893

[22] Filed: Jun. 26, 1997

[51] Int. Cl.[6] .................................. B41J 2/01; B41J 2/12
[52] U.S. Cl. .................................................. 347/1; 347/78
[58] Field of Search ........................... 347/1, 78; 75/345; 118/623; 156/150

[56] References Cited

U.S. PATENT DOCUMENTS

| | | | |
|---|---|---|---|
| 3,287,734 | 11/1966 | Kazan | 347/82 |
| 3,484,794 | 12/1969 | Winston | 347/82 |
| 3,851,136 | 11/1974 | Venus et al. | 219/121 |
| 4,190,845 | 2/1980 | Cooper et al. | 347/77 |
| 4,391,620 | 7/1983 | Geisel | 65/26 |
| 5,332,197 | 7/1994 | Benz et al. | 266/201 |
| 5,560,543 | 10/1996 | Smith et al. | 347/1 |

*Primary Examiner*—N. Le
*Assistant Examiner*—Thien Tran

[57] ABSTRACT

An electrostatic three-dimensional printer in which molten material drops such as plastic and wax are given an electrostatic charge, and accelerated through a guiding magnetic field. Just as an electron is accelerated and guided in a cathode ray tube. Any molten material may be used. Parts are created by the build up of multiple layers of these droplets. When parts have overhangs a second removable material is used. In the case of plastic a lower melting point wax could be used to support the overhanging plastic then later removed from the part by melting.

2 Claims, 1 Drawing Sheet

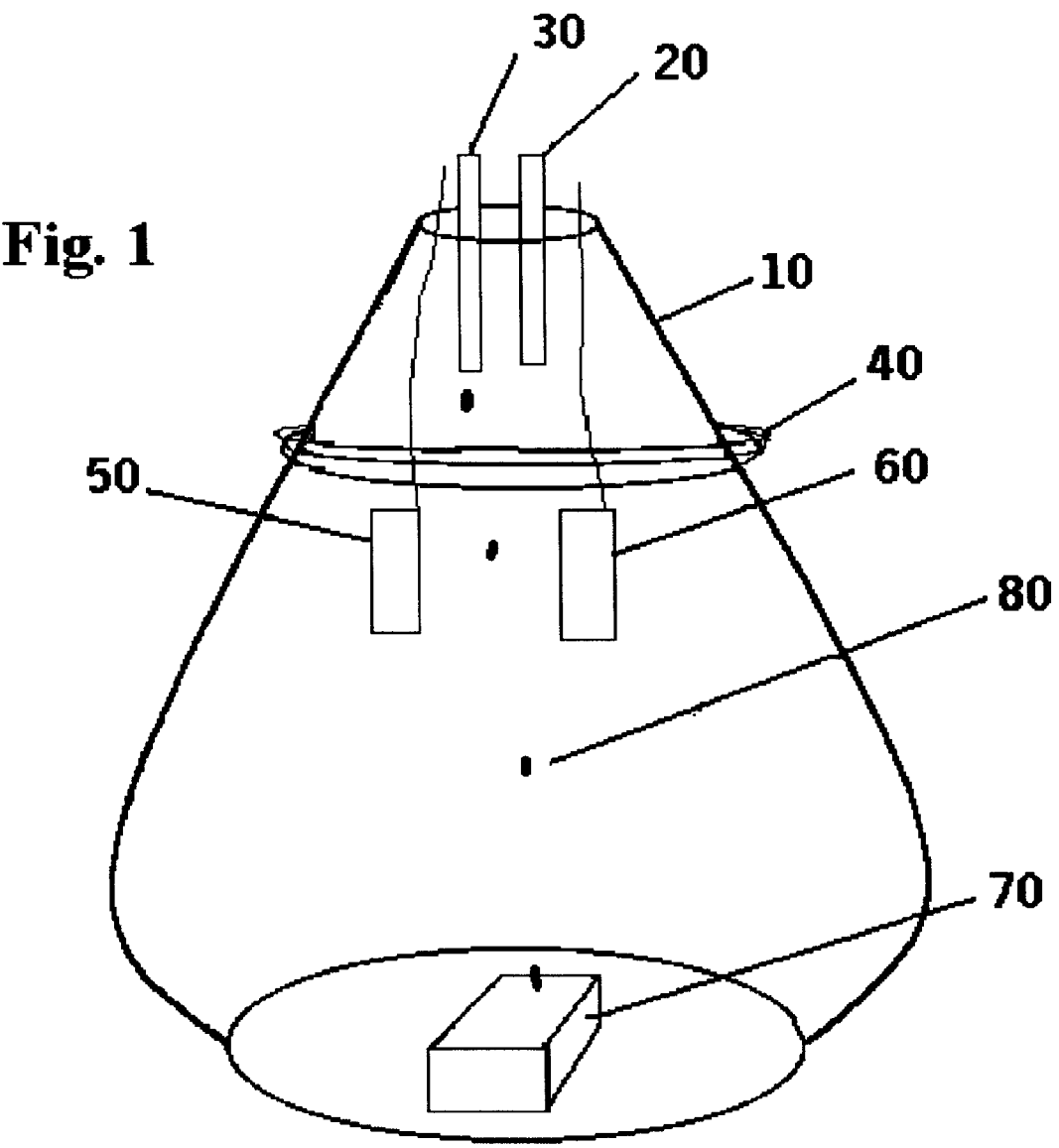

ELECTROSTATIC THREE DIMENSIONAL PRINTER

A BRIEF SUMMARY OF THE INVENTION

This invention relates to the creation of objects. Where any three dimensional object can be made by the deposition of molten material one drop at a time. The charged drops are directed in three dimensional space by controlled electromagnetic fields. As the drops are deposited and cooled a three dimensional object is built up.

BACKGROUND OF THE INVENTION

The invention relates an electrostatic three-dimensional printer. Prior art shows how to create 3-D parts by the subtractive process where a block of material is carved in such a way as to remove all unwanted material leaving only the material of the shape or part desired. The problem with this technique is that it is very difficult to created proper undercuts and curved surfaces in three dimensions and requires expensive multi-axis CAD-CAM machines to move the cutting tool. Another method has been the use of rapid prototyping techniques that use lasers to harden the surface of a plastic part as a platform is lowered into the liquid. This technique is slow and limited to the plastics that can be hardened with laser light in addition to requiring complicated mechanical motion of the laser and the platform. This invention is unique in that it does not move the part or the drop nozzle. The material for the part creation is heated to its melting point then atomized into fine droplets that are accelerated across and electrostatic gradient. The droplets are then guided by an encircling magnetic field in much the same way as electrons are guided in a TV tube.

OBJECTS AND ADVANTAGES

Accordingly, the following as my objects and advantages of the invention: to provide a three-dimensional printer that can create three-dimensional parts out of any material that can be melted.

In addition, the following as objects and advantages of the invention: to provide a three-dimensional printer that does not need to move either the part nor does it need to move the nozzle that provides the material from which the part or object is to be made.

DRAWING FIGURE

FIGURE shows a perspective of the three-dimensional printer.

DRAWING REFERENCE NUMERALS

FIGURE has:
Element 10: containment vessel
Element 20: nozzle # 1
Element 30: nozzle # 2
Element 40: magnetic coils
Element 50: positive plates
Element 60: negative plates

DETAILED DESCRIPTION OF THE PREFERRED EMBODIMENTS

FIGURE shows an electrostatic three-dimensional printer according to the preferred embodiment of the invention. The printer consists of a containment vessel 10 that may be at or above or below atmospheric pressure depending on the material being used for part creation. At the upper end of the vessel are the nozzles that carry the molten material. Multiple nozzles may be used for example to create a part with a wide overhang in plastic. The first nozzle 20 would be used to for the plastic that the part would be made of and the second nozzle 30 would be used for a support material such as wax that would support the plastic overhang as the part was being built up. After the part 70 is finished the second material would be removed in this case the wax would be melted away but any complementary material combination could be used. During part creation multiple layers of molten material are applied to the part by controlling the magnetic coil 40 from a computer in much the same way television's cathode ray tube controls the position of electrons hitting the screen. Small droplets of material coming from the nozzles are given an electrostatic charge and accelerated between the positively charged plates 50 and negatively charged plates 60. The magnetic coil 40 controls their direction to the part.

I claim:

1. An electrostatic three dimensional printer comprising:
   a containment vessel including:
      a top end having one or more discharge nozzles and a positive electrically charged plate or plates, a bottom end,
         an electrically charged middle area including a magnetic coil or coils under control of and attachable to an electric source,
   and wherein the bottom end has a negatively charged plate or plates and where molten material drops entering the vessel from the nozzles become charged by said positively electrically charged plates and are accelerated towards the bottom end negatively charged plate as these drops move in a direction of movement being controlled by said magnetic coil or coils in such a way as to create an object or part built up from said drops.

2. The electrostatic three dimensional printer of claim 1 wherein said printer uses a molten material or combination of molten material for part creation the material being selected from the group consisting of plastic and wax.

* * * * *